United States Patent
Lu et al.

(10) Patent No.: US 9,928,197 B2
(45) Date of Patent: Mar. 27, 2018

(54) USB DEVICE AND METHOD THEREOF FOR RECOGNIZING HOST OPERATING SYSTEM

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 366 days.

(21) Appl. No.: 14/433,964

(22) PCT Filed: Nov. 29, 2013

(86) PCT No.: PCT/CN2013/088180
§ 371 (c)(1),
(2) Date: Apr. 7, 2015

(87) PCT Pub. No.: WO2014/101626
PCT Pub. Date: Jul. 3, 2014

(65) Prior Publication Data
US 2015/0293869 A1   Oct. 15, 2015

(30) Foreign Application Priority Data

Dec. 28, 2012   (CN) .......................... 2012 1 0589947

(51) Int. Cl.
*G06F 3/00* (2006.01)
*G06F 13/38* (2006.01)
(Continued)

(52) U.S. Cl.
CPC ............ *G06F 13/387* (2013.01); *G06F 9/441* (2013.01); *G06F 9/4411* (2013.01); *G06F 13/385* (2013.01); *G06F 13/4221* (2013.01)

(58) Field of Classification Search
CPC ............................... G06F 9/441; G06F 9/4411
(Continued)

(56) References Cited

U.S. PATENT DOCUMENTS

2004/0054836 A1* 3/2004 Lai .................. G06F 3/0661
710/305
2008/0091399 A1* 4/2008 Chou ................ G06F 9/45537
703/13
(Continued)

FOREIGN PATENT DOCUMENTS

| CN | 101957807 A | 1/2011 |
| CN | 102043751 A | 5/2011 |
| CN | 103092799 A | 5/2013 |

OTHER PUBLICATIONS

International Search Report dated Feb. 27, 2014 corresponding to PCT/CN2013/088180, 11 pp.
(Continued)

*Primary Examiner* — Farley Abad
*Assistant Examiner* — Getente A Yimer
(74) *Attorney, Agent, or Firm* — Ohlandt, Greeley, Ruggiero & Perle, LLP

(57) ABSTRACT

Provided are a USB device and a method thereof for recognizing a host operating system. The method comprises the following steps: a USB device waiting for receiving a USB command from a host; determining whether the received USB command is a command for obtaining a configuration descriptor; if yes, determining a host operating system according to values of a first flag and a second flag and a value of a length byte in the command for obtaining the configuration descriptor; after the host operating system is determined, performing, by using a corresponding communications protocol, data communication with the host according to the host operating system, and shielding a file which cannot be operated under the host operating system,
(Continued)

thereby making the host accurately recognize and operate the USB device, and making the USB device and the application of the USB device further optimized.

14 Claims, 4 Drawing Sheets

(51) Int. Cl.
 *G06F 9/44* (2018.01)
 *G06F 13/42* (2006.01)
(58) Field of Classification Search
 USPC .................................................. 710/5, 15, 16
 See application file for complete search history.

(56) References Cited

U.S. PATENT DOCUMENTS

| | | | | |
|---|---|---|---|---|
| 2008/0215765 A1* | 9/2008 | Butler | ................... | G06F 1/3203 710/15 |
| 2008/0263243 A1* | 10/2008 | Wright | ............. | H03K 19/00369 710/63 |
| 2009/0248907 A1* | 10/2009 | Huang | ................... | G06F 13/385 710/10 |
| 2010/0082846 A1* | 4/2010 | Kim | ....................... | G06F 13/426 710/14 |
| 2010/0235655 A1* | 9/2010 | Tauscher | ................. | G06F 1/266 713/300 |
| 2012/0054372 A1* | 3/2012 | Chen | .................... | G06F 9/4415 710/13 |
| 2012/0079145 A1 | 3/2012 | Chang et al. | | |
| 2012/0166846 A1* | 6/2012 | Wu | ....................... | G06F 1/3209 713/323 |

OTHER PUBLICATIONS

International Written Opinion dated Feb. 27, 2014 corresponding to PCT/CN2013/088180, 4 pp.

* cited by examiner

USB DEVICE AND METHOD THEREOF FOR RECOGNIZING HOST OPERATING SYSTEM

The present application claims priority to Chinese Patent Application NO. CN201210589947.1, filed with the Chinese Patent Office on Dec. 28, 2012, entitled as "USB DEVICE AND METHOD THEREOF FOR RECOGNIZING HOST OPERATING SYSTEM", the entire contents of which are is incorporated herein by reference in its entirety.

FIELD

The present invention relates to information security field, particularly to a USB device and method thereof for recognizing host operating system.

BACKGROUND

USB protocol technology is a universal serial bus standard for connection between a host and a peripheral, which is widely used in a host, such as personal computer, personal digital assistant and mobile computer, and supports hot plug, i.e. hot plug and play, supplies power to bus. Almost all of the peripherals such as mouses, keyboards, game paddles, scanners, digital cameras, printers, hardwares, security devices, CD drivers and net cards, etc. can connect to and communicate with a host via USB interfaces. At present, USB interfaces become default interfaces which are used to connect a peripheral to a host.

In the aspect of operating system platform, Windows system platform, such as Windows 98, Windows 2000, Windows XP, Windows Vista and Windows 7, etc, iOS (Apple operating system) and Linux system support USB interfaces.

In process of implementing the present invention, the inventors find at least a defect following existing in the conventional technology:

in the conventional technology, in the case that the USB device communicates with the host, the USB device can not recognize the host operating system.

SUMMARY

The present invention provides a USB device and a method for recognizing host operating system thereof so as to solve the defect that the USB device can not recognize host operating system.

A method for a Universal Serial Bus (USB) device recognizing host operating system, includes:
  step S1 including powering up the USB device;
  step S2 including initializing, by the USB device, a first identification flag and a second identification flag of the USB device to a first preset value and a second preset value respectively;
  step S3 including waiting, by the USB device, for a USB command from a host;
  step S4 including determining, by the USB device, whether a received USB command is a command of obtaining a configuration descriptor, going to step S6 in the case of a positive determination; otherwise, going to step S5;
  step S5 including performing, by the USB device, a corresponding operation according to the received USB command; going back to step S3;
  step S6 including determining, by the USB device, whether a value of the first identification flag is the first preset value, going to step S8 in the case of a positive determination; otherwise, going to step S7;
  step S7 including performing, by the USB device, a corresponding operating according to the received command of obtaining a configuration descriptor; going back to step S3;
  step S8 including determining, by the USB device, a value of a length byte in the received command of obtaining a configuration descriptor and a value of the second identification flag;
  if the value of the second identification flag is the second preset value and the value of the length byte is a third preset value, going to step S9;
  if the value of the second identification flag is the second preset value and the value of the length byte is a fourth preset value, going to step S10;
  if the value of the second identification flag is an eighth preset value and the value of the byte length is a fifth preset value, going to step S11;
  if the value of the second identification flag is a ninth preset value and the value of the byte length is a sixth preset value, going to step S12;
  if the value of the second identification flag is the ninth preset value and the value of the length byte is a seventh preset value, going to step S13;
  otherwise, sending, by the USB device, preset descriptor information to the host; going back to step S3;
  step S9 including setting, by the USB device, the value of the second identification flag as the eighth preset value; going back to step S3;
  step S10 including setting, by the USB device, the value of the second identification flag as the ninth preset value; going back to step S3;
  step S11 including determining, by the USB device, that an operating system of the host is the Apple operating system, setting the value of the first identification flag as an eleventh preset value; going back to step S3;
  step S12 including determining, by the USB device, that the operating system of the host is the Windows system, setting the value of the first identification flag as the eleventh preset value; going back to step S3; and
  step S13 including determining, by the USB device, that the operating system of the host is the Linux system, setting the value of the first identification flag as the eleventh preset value; going back to step S3.

A Universal Serial Bus device, includes:
  an initializing module configured to initialize a first identification flag and a second identification flag to a first preset value and a second preset value respectively;
  a receiving module configured to receive a USB command from a host;
  a first determining module configured to determine whether a USB command received by the receiving module is a command of obtaining a configuration descriptor;
  a first processing module configured to, in the case that the first determining module determines that the USB command is not the command of obtaining a configuration descriptor, perform a corresponding operation according to the USB command;
  a second determining module configured to, in the case that the first determining module determines that the USB command is the command of obtaining a configuration descriptor, determine whether a value of the first identification flag is the first preset value;

a second processing module configured to, in the case that the second determining module determines that the value of the first identification flag is not the first preset value, perform a corresponding operation according to the command of obtaining a configuration descriptor;

a third determining module configured to, in the case that the second determining module determines that the value of the first identification flag is the first preset value, determine a value of a length byte and a value of the second identification flag in the command of obtaining a configuration descriptor;

a setting module configured to, in the case that the third determining module determines that the value of the second identification flag is the second preset value and the value of the length byte is a third preset value, set the second identification flag as an eighth preset value; in the case that the third determining module determines that the value of the second identification flag is the second preset value and the value of the length byte is a fourth preset value, set the value of the second identification flag as a ninth preset value; in the case that the third determining module determines that the value of the second identification flag is the eighth preset value and the value of the length byte is a fifth preset value, determine that the operating system of the host is the Apple operating system and set the value of the first identification flag as an eleventh preset value; in the case that the third determining module determines that the value of the second identification flag is the ninth preset value and the value of the length byte is a sixth preset value, determine that the operating system of the host is the Windows system and set the value of the first identification flag as the eleventh preset value; in the case that the third determining module determines that the value of the second identification flag is the ninth preset value and the value of the length byte is a seventh preset value, determine the operating system of the host is the Linux system and set the value of the first identification flag as the eleventh preset value; and a sending module configured to, in the case that the third determining module determines that the value of the second identification flag and the value of the length byte are else values, send preset descriptor information to the host.

In the technical solution of embodiments of the present invention, the USB device analyzes the command of obtaining a configuration descriptor sent by the host, determines the operating system of the host according to the value of the length byte in the command of obtaining a configuration descriptor, performs data communication with the host through the corresponding communication protocol after the host operating system is determined so as to make the host correctly recognize and operate the USB device and make the USB device and its application optimized.

DETAILED DESCRIPTION

The technical solutions of the embodiments of the disclosure are described clearly and completely in conjunction with the drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

Before the detailed description, communication between a USB device and a host is illustrated briefly as follows.

The communication between the USB device and the host is that: the host sends a USB command to the USB device; the USB device receives and sends data via an endpoint, responds to the received command. The basic unit of the communication between the USB device and the host is a packet Mainly Kinds of the packets includes a token packet, a data packet and a hand shaking packet. Packet Identification (PID) is for determining a specific type of a packet.

The format of the token packet is SYNC+PID+ADDR+ENDP+CRC. The data packet includes a DATA 0 packet and a DATA1 packet. In the case that a length of data returned by a USB device exceeds a maximum length of the data packet of corresponding endpoint, the returned data is required to be sent in batches via the DATA0 packet and DATA1. Generally, the DATA0 packet and DATA1 packet are sent alternately. The format of the hand shaking packet is SYNC+PID.

For example,

```
PID:SETUP   ADDR:00   ENDP:00   CRCS:02   idle:3
PID:DATA0   data:80 06 00 01 00 00 40 00 CRC16:94dd
idle:7
PID:ACK   idle:2ela.
```

The command above shows that the packet is a SETUP packet, the data content is 80 06 00 01 00 00 40 00, the hand shaking packet is ACK; in this case, the SETUP packet is sent by the host. Upon receiving the SETUP packet, the USB device returns a response to the host, for example:

```
PID:IN   ADDR:00   ENDP:00   CRC5:02   idle:7
PID:DATA1   data:12 01 10 01 00 00 00 08   CRC16:7711   idle:7
PID:ACK   idle:2e16
PID:OUT   ADDR:00   ENDP:00   CRC5:02   idle:3
PID:DATA1   data:   CRC16:0000   idle:7
PID:ACK   idle:2e5a.
```

The response data returned by the USB device to the host is 12 01 10 01 00 00 00 08. Note that, upon receiving IN token packet or OUT token packet sent by the host, the USB device return a response to the host.

In this way, the USB device and the host completes an information interaction for one time; each time of the information interaction is started on receiving the SETUP packet sent by the host.

Embodiment 1

Figure 1:
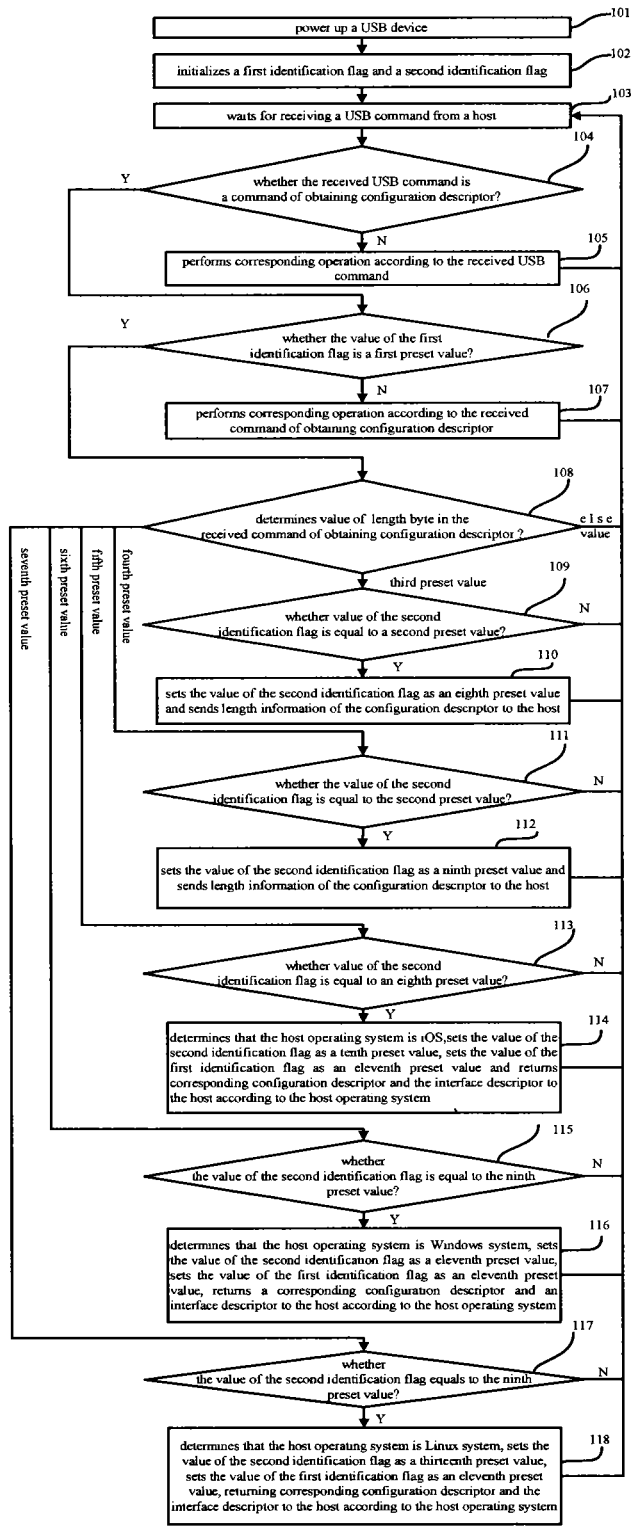
FIG. 1 is a flow chart for a method for a USB device recognizing host operating system provided in embodiment 1 of the present invention.

FIG. 1 shows a flow chart for a method of a USB device recognizing a host operating system. The method includes following step 101 to step 118.

In step 101, the USB device is powered up.

The USB device connects to the host via Universal Serial Bus and obtains working voltage from Vcc, i.e., a power source voltage or a working voltage, of the host. In this case, the USB device may be a peripheral of a computer, such as a security device, a USB device, a card reader, a storage device like a thumb drive, a key board, a mouse, etc.

In step 102, the USB device initializes a first identification flag and a second identification flag.

The USB device may set a value of the first identification flag as a first preset value and set a value of the second identification flag as a second preset value. In this case, the first identification flag is for recognizing whether the USB device recognizes a host operating system; the second identification flag is for recognizing a type of the host operating system. In the case that the value of the first identification flag is the first preset value, it indicates that the USB device does not recognize the host operating system; in the case that the value of the identification flag is the second preset value, it indicates that the type of the host operating system is unknowable. For example, the first preset value and the second preset value may be 0.

In step 103, the USB device waits for receiving a USB command from the host.

In step 104, the USB device determines whether the received USB command is a command of obtaining a configuration descriptor, goes to step 106 in the case of a positive determination; otherwise, goes to step 105.

In this case, the command of obtaining a configuration descriptor is a USB command which is sent to the USB device at a stage that the host enumerates the USB device. The host sends the command of obtaining a configuration descriptor to the USB device to obtain a configure descriptor of the USB device.

In step 105, the USB device performs a corresponding operation according to the received USB command; goes back to step 103.

The USB device may perform an operation corresponding to the received USB command according to the host operating system.

In step 106, the USB device determines whether the value of the first identification flag is the first preset value, goes to step 108 in the case of a positive determination; otherwise, goes to step 107.

In step 107, the USB device performs a corresponding operation according to the received command of obtaining a configuration descriptor; goes back to step 103.

The USB device may perform an operation corresponding to the received command of obtaining a configuration descriptor according to the host operating system.

In step 108, the USB device determines a value of a length byte in the received command of obtaining a configuration descriptor, goes to step 109 if the value of the length byte is a third preset value; if the value of the length byte is a fourth preset, goes to Step 111; if the value of the length byte is a fifth preset value, goes to Step 113; if the value of the length byte is a sixth preset value, goes to Step 115; if the value of the length byte is a seventh preset value, goes to Step 117; if the value of the length byte is an else value, sends preset descriptor information to the host and goes back to step 103.

In this case, the command of obtain configuration descriptor may contain the DATA0 data with length of 8 bytes. The length byte is the seventh byte of the DATA 0 data of the command of obtaining a configuration descriptor and is for informing the USB device of the required length of data returned to the host. In the present embodiment, the third preset value is 0x04, the forth preset value is 0x09, the fifth preset value is 0x56, the sixth preset value is 0xFF and the seventh preset value is 0x20.

For example, the command of obtaining a configuration descriptor received by the USB device from the host is:

```
PID:SETUP  ADDR:00  ENDP:00  CRC5:02  idle:3
PID:DATA0  data:80 06 00 01 00 00 08 00  CRC16:94eb  idle:7
PID:ACK    idle:3a.
```

The value, read by the USB device, of the seventh byte in the data field in the command of obtaining a configuration descriptor is 0x08. The value of the length byte in the command of obtaining a configuration descriptor is determined to be 0x08 and 8 byte of data is needed to be returned to the host by the USB device.

In step 109, the USB device determines whether the value of the second identification flag equals to the second preset value, goes to step 110 in the case of a positive determination; otherwise, the USB device sends preset descriptor information to the host and goes back to step 103.

In step 110, the USB device sets the value of the second identification flag as an eighth preset value and sends length information of the configuration descriptor to the host; goes back to step 103.

In this case, in the case that the value of the second identification flag is the eighth preset value, it indicates that the host operating system may be the iOS. In Embodiment 1, the eighth preset value is iOSRe.

In step 111, the USB device determines whether the value of the second identification flag equals to the second preset value, goes to step 112 in the case of a positive determination; otherwise, the USB device sends preset descriptor information; goes back to step 103.

In step 112, the USB device sets the second identification flag as a ninth preset value and sends length information of the configuration descriptor to the host, goes back to step 103.

In this case, in the case where the value of the second identification flag is the ninth preset value, it indicates that the host operating system may be Linux system or Windows. In Embodiment 1, the ninth preset value is Linux system/Windows_Re.

In step 113, the USB device determines whether the value of the second identification flag equals to the eight preset value, goes to step 114 in the case of a positive determination; otherwise, the USB device sends preset descriptor information, and goes back to step 103.

In step 114, the USB device determines the operating system is iOS; the value of the second identification flag is set as a tenth preset value; the value of the first identification flag is set as a eleventh preset value; the USB device returns a corresponding configuration descriptor and an interface descriptor to the host according to the host operating system; goes back to step 103.

In this case, in the case that the value of the second identification flag is the tenth preset value, it indicates that the host operating system is iOS; in the case that the value of the first identification flag is the eleventh preset value, it indicates that host operating system is recognized by the USB device. In Embodiment 1, the tenth preset value is iOS; the eleventh preset value is 1.

In Embodiment 1, in the case that the USB device recognizes the host operating system is iOS, the USB device selects a USB Chip/Smart Card Interface Devices (CCID) protocol as a communication protocol between the USB device and the host, set the value of the preset field in the interface descriptor as a fourteenth preset value, sends the configuration descriptor and the interface descriptor to the host, performs data communication with the host through the selected communication protocol. In this case, the configuration descriptor is configured to describe configuration information of the USB device, the interface descriptor is configured to describe interface information of the USB device, the first preset field is a bInterfaceClass field, the fourteenth preset value is 0x0B or an else value. In addition, the USB device may send an endpoint descriptor and a CCID descriptor to the host. The endpoint descriptor is configured to describe the information of a port used by the USB device; the CCID descriptor is configured to describe features possessed by the USB device which functions as a CCID device.

In the case that the USB device determines that the host operating system is the iOS, the USB device may further shield its contained content which are not adaptable to the iOS.

In step 115, the USB device determines whether the value of the second identification flag equals to a ninth preset value, goes to step 116 in the case of a positive determination; otherwise, the USB device sends the preset descriptor information and goes back to step 103.

In step 116, the USB device determines that the host operating system is the Windows system, sets the value of the second identification flag as a twelfth preset value, sets the value of the first identification flag as an eleventh preset value, returns a corresponding configuration descriptor and an interface descriptor to the host according to the host operating system; goes back to step 103.

In the case that the value of the second identification flag is the seventh preset value, it indicates that the host operating system is Windows. In the case that the value of the first identification flag is the eleventh preset value, it indicates that the host operating system is recognized by the USB device. In Embodiment 1, the twelfth preset value is Windows, the eleventh preset value is 1.

In Embodiment 1, in the case that the USB device recognizes that the host operating system is the Windows system, the USB device may select the Small Computer System Interface (SCSI) protocol as a communication protocol between the USB device and the host, set the values of a first preset field and a second preset field in the interface descriptor as a fifteenth preset value and a sixteenth preset value respectively, perform data communication with the host through the selected communication protocol. In this case, the configuration descriptor is configured to describe configuration information of the USB device; the interface descriptor is configured to describe the interface information of the USB device; the first preset field is a bInterfaceClass field; the second preset field is a bInterfaceProtocol field; the fifteenth preset value is 0x08 or an else value; the sixteenth value is 0x50 or an else value. In addition, the USB device may send an endpoint descriptor to the host; the endpoint descriptor is configured to describe information of the port used by the USB device interface.

In the case that the USB device recognizes that the host operating system is the Windows system, the USB device may select a Human Interface Device (HID) protocol as communication protocol between the USB device and the host, set the values of a first preset field and a third preset field in the interface descriptor as a seventeenth preset value and an eighteenth preset value respectively, perform data communication with the host through the selected communication protocol. The configuration descriptor is configured to describe the configuration information of the USB device; the interface descriptor is configured to describe interface information of the USB device; the first preset field is a bInterfaceClass field; the third preset field is a bInterfaceSubClas field; the seventeenth preset value is 0x03 or an else value; the eighteenth preset value is 0 or 1 or an else value. In addition, the USB device may send an endpoint descriptor, an HID descriptor, a reporting descriptor and an entity descriptor to the host. In this case, the endpoint descriptor is configured to describe the information of the port used by the USB device interface; the HID descriptor is configured to describe features possessed by a USB device which functions as an HID device; the entity descriptor is configured to describe behavior features possessed by a USB device which functions as an HID device.

Preferably, in the case that the USB device determines that the host operating system is the Windows system, the USB device may shield its contained a content which is not adaptable to the Windows system.

In step 117, the USB device determines whether the value of the second identification flag equals to the ninth preset value, goes to step 118 in the case of a positive determination; otherwise, the USB device sends preset descriptor information to the host and goes back to step 103.

In step 118, the USB device determines that the host operating system is a Linux system, sets the value of the second identification flag as a thirteenth preset value, sets the value of the first identification flag as the eleventh preset value and returns a corresponding configuration descriptor and an interface descriptor to the host according to the host operating system and goes back to step 103.

In this case, in the case that the value of the second identification flag is the thirteenth preset value, it indicates that the host operating system is the Linux system; in the case that the value of the first identification flag is the eleventh preset value, it indicates that the host operating system is recognized by the USB device. In Embodiment 1, the thirteenth preset value is the Linux system; the eleventh preset value is 1.

In Embodiment 1, in the case that the USB device recognizes the host operating system being the Linux system, the USB device may select the SCSI protocol as a communication protocol between the USB device and the host, set the values of the first preset field and the second preset field in the interface descriptor as the fifteenth preset value and a sixteenth preset value and perform data communication with the host with the selected communication protocol. The configuration descriptor is configured to describe the configuration information of the USB device; the interface descriptor is configured to describe the interface information of the USB device; the first preset field is a bInterfaceClass field; the second preset field is a bInterfaceProtocol field; the fifteenth preset value is 0x08 or an else value; the sixteenth preset value is 0x50 or an else value. In addition, the USB device may send an endpoint descriptor to the host; the endpoint descriptor is configured to describe the information of a port used by the interface of the USB device.

In the case that the USB device recognizes the host operating system being the Linux system, the USB device may alternatively select the HID protocol as communication protocol between the USB device and the host, set the values of the first preset field and the third preset field in the interface descriptor as a seventeenth preset value and an eighteenth preset value respectively, and perform data communication with the host through the selected communication protocol. The configuration descriptor is configured to describe the configuration information of the USB device; the interface descriptor is configured to describe the interface information of the USB device; the first preset field is a bInterfaceClass field; the third preset field is a bInterfaceSubClass field; the seventeenth preset value is 0x03 or an else value; the eighteenth preset value is 0 or 1 or an else value. In addition, the USB device may send an endpoint descriptor, an HID descriptor, a report descriptor and an entity descriptor to the host. In this case, the endpoint descriptor is configured to describe the information of the port used by the USB device interface; the HID descriptor is configured to describe features possessed by a USB device which functions as an HID device; the entity descriptor is configured to describe behavior features possessed by a USB device which functions as an HID device.

Preferably, in the case that the USB device determines that the host operating system is the Linux system, the USB device may shield its contained content which is not adaptable to the Linux system. For example, in the case that the USB device recognizes that the host operating system is the Linux system and states itself as SCSI compact disc device, the USB device may shield a its contained ISO file, i.e. an image file.

In the technical solution of Embodiment 1, the USB device analyzes the command of obtaining a configuration descriptor sent by the host, determines the values of the first identification flag and the second identification flag of its own, determines the host operating system according to the value of the length byte in the command of obtaining a configuration descriptor and the first identification flag and second identification flag of its own, performs data communication with the host through a communication protocol corresponding to the host operating system is determined after the host operating system is determined, shields the file which can not be operated in the determined host operating system so as to make the host correctly recognize and operate the USB device and make the USB device and its application optimized.

It should be noted that, in other embodiments of the present invention, the USB device may select the SCSI protocol as communication protocol between the USB device and the host in the case that the USB device recognizes the host operating system, the USB device may shield a its contained ISO file in the case that the USB device states itself as a SCSI compact disc device, which may achieve the purpose of the present disclosure as well.

Embodiment 2

Figure 2:
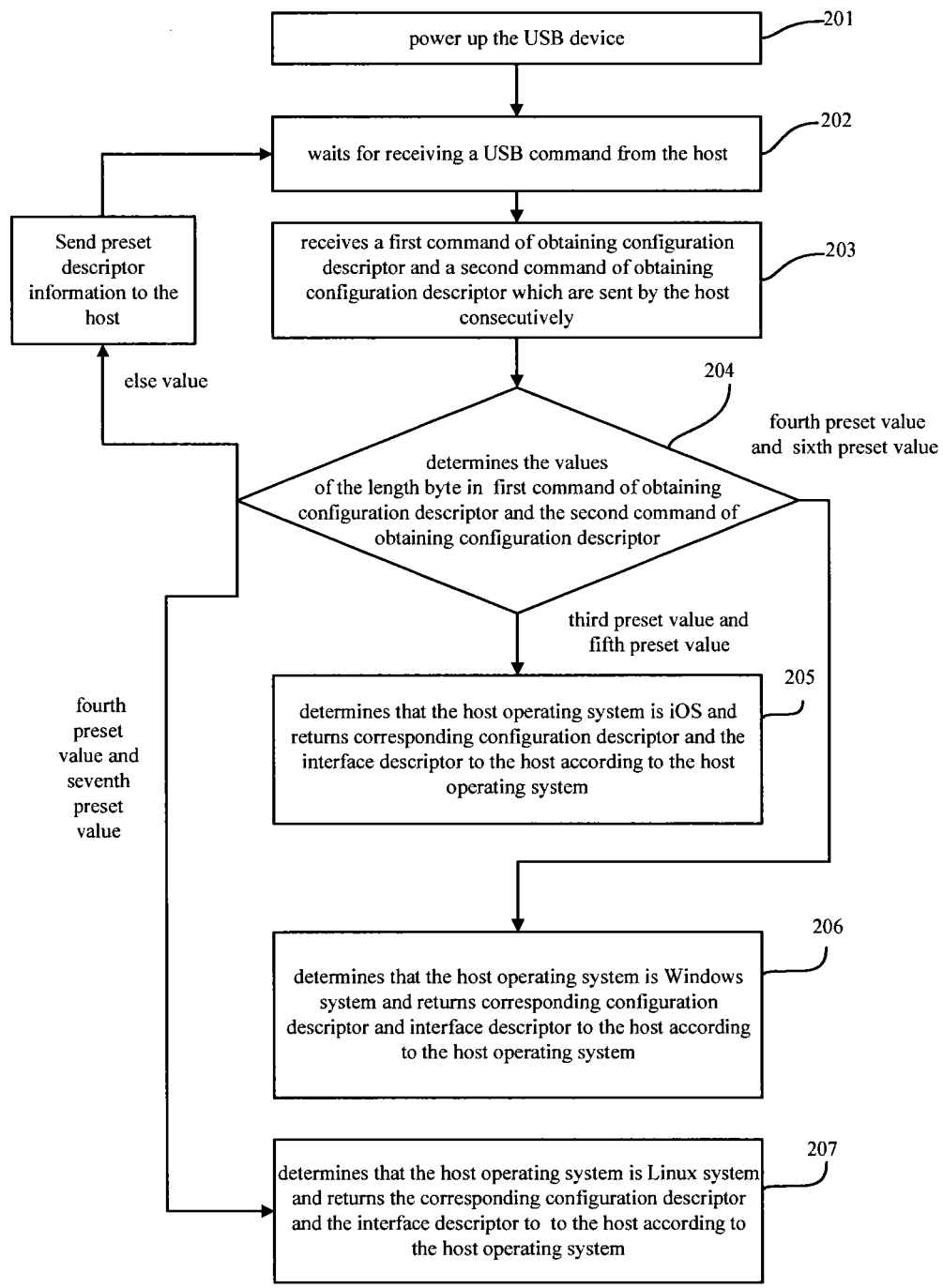
FIG. 2 is a flow chart for a method for a USB device recognizing host operating system provided in embodiment 2 of the present invention.

FIG. 2 shows a flow chart of a method for a USB device recognizing host operating system in Embodiment 2. The method includes following steps from step 201 to step 207.

In step 201, the USB device is powered up.

In step 202, the USB device waits for receiving a USB command from a host.

In step 203, the USB device receives a first command of obtaining a configuration descriptor and a second command of obtaining a configuration descriptor continuously.

The first command of obtaining a configuration descriptor and the second command of obtaining a configuration descriptor are USB commands which are sent to the USB device at a stage that the host enumerates the USB device. The host sends the first command of obtaining a configuration descriptor and the second command of obtaining a configuration descriptor to the USB device to request to obtain the configuration descriptor of the USB device. The first command of obtaining a configuration descriptor is configured to try to obtain the configuration descriptor; the second command of obtaining the configuration descriptor is configured to formally obtain the configuration descriptor.

After the USB device receives the first command of obtaining a configuration descriptor and the second command of obtaining a configuration descriptor, the length bytes included in the first command of obtaining a configuration descriptor and the second command of obtaining a configuration descriptor may be stored by the USB device.

In step 204, the USB device determines values of the length bytes included in the first command of obtaining a configuration descriptor and the second command of obtaining a configuration descriptor, goes to step 205 if the values of the length bytes in the first command of obtaining a configuration descriptor and the second command of obtaining a configuration descriptor are a third preset value and a fifth preset value respectively; if the values of the length bytes in the first command of obtaining a configuration descriptor and the second command of obtaining a configuration descriptor are a fourth preset value and a sixth preset value respectively, goes to step 206; if the values of the length bytes in the first command of obtaining a configuration descriptor and the second command of obtaining a configuration descriptor are the fourth preset value and a seventh preset value respectively, goes to step 207; if the values of the length bytes in the first command of obtaining a configuration descriptor and the second command of obtaining a configuration descriptor are other values, the USB device sends preset descriptor information to the host; goes back to step 202.

The command of obtaining a configuration descriptor may contain data DATA0 with a length of 8 bytes. The length byte is the seventh byte in the data field of the command of obtaining a configuration descriptor. In Embodiment 2, the third preset value is 0x04; the fourth preset value is 0x09; the fifth preset value is 0x56; the sixth preset value is 0xFF; the seventh preset value is 0x20.

In step 205, the USB device determines that the host operating system is iOS and returns a corresponding configuration descriptor and an interface descriptor to the host according to the host operating system.

In Embodiment 2, in the case that the USB device recognizes that the host operating system is iOS, the USB device selects the CCID protocol as a communication protocol between the USB device and the host, sets the value of a first preset field in the interface descriptor as a fourteenth preset value, sends the configuration descriptor and the interface descriptor to the host and performs data communication with the host through the selected communication protocol. In this case, the configuration descriptor is configured to describe configuration information of the USB device; the interface descriptor is configured to describe the interface information of the USB device; the first preset field is a bInterfaceClass field; the fourteenth preset value is 0x0B or an else value. In addition, the USB device may further send an endpoint descriptor and a CCID descriptor to the host; the endpoint descriptor is configured to describe the information of the port used by the interface of the USB device; the CCID descriptor is configured to describe features possessed by a USB device which functions as a CCID device.

In the case that the USB device determines that the host operating system is iOS, the USB device may shield its self-contained content which is not adaptable to iOS.

In step 206, the USB device determines that the host operating system is Windows system and returns a corresponding configuration descriptor and a corresponding interface descriptor according to the host operating system.

In Embodiment 2, in the case that the USB device determines that the host operating system is the Windows system, the USB device may select the SCSI protocol as the communication protocol between the USB device and the host, set the values of the first preset field and the second preset field in the interface descriptor as a fifteenth preset value and a sixteenth preset value respectively and perform data communication with the host through the selected communication protocol. The configuration descriptor is configured to describe the configuration information of the USB device; the interface descriptor is configured to describe the interface information of the USB device; the first preset field is a bInterfaceClass field; the second preset field is a bInterfaceProtocol field; the fifteenth preset value is 0x08 or an else value; the sixteenth preset value is 0x50 or an else value. In addition, the USB device may further send an endpoint descriptor to the host; the endpoint descriptor is configured to describe the information of the port used by the interface of the USB device.

In the case that the USB device recognizes that the host operating system is the Windows system, the USB device may alternatively select the HID protocol as a communication protocol between the USB device and the host, set the values of the first preset field and a third preset field in the interface descriptor as a seventeenth preset value and an eighteenth preset value respectively, and perform data communication with the host through the selected communication protocol. In this case, the configuration descriptor is configured to describe the configuration information of the USB device; the interface descriptor is configured to describe the interface information of the USB device; the first preset field is a bInterfaceClass field; the third preset field is a bInterfaceSubClass; the seventeenth preset value is 0x03 or an else value; the eighteenth preset value is 0 or 1, or an else value. In addition, the USB device may further send an endpoint descriptor, an HID descriptor, a reporting descriptor and an entity descriptor to the host. In this case, the endpoint descriptor is configured to describe information of the port used by the interface of the USB device; the HID descriptor is configured to describe the features possessed by a USB device which functions as an HID device; the entity descriptor is configured to describe behavior features possessed by a USB device which functions as an HID device.

In the case that the USB device determines that the host operating system is the Windows system, the USB device may shield its self-contained content which is not adaptable to the Windows system.

In step 207, the USB device determines that the host operating system is the Linux system, returns a corresponding configuration descriptor and a corresponding interface descriptor to the host according to the host operating system.

In Embodiment 2, in the case that the USB device determines that host operating system is the Linux system, the USB device may select the SCSI protocol as a communication protocol between the USB device and the host, set the values of the first preset field and the second preset field in the interface descriptor as a fifteenth preset value and a sixteenth preset value respectively, perform data communication with the host through the selected communication protocol. In this case, the configuration descriptor is configured to describe the configuration information of the USB device; the interface descriptor is configured to describe interface information of the USB device; the first preset field is a bInterfaceClass field; the second preset field is a bInterfaceProtocol field, the fifteenth preset value is 0x08 or an else value; the sixteenth preset value is 0x50 or an else value. In addition, the USB device may further send an endpoint descriptor to the host; the endpoint descriptor is configured to describe the information of port used by the interface of the USB device.

In the case that the USB device recognizes that the host operating system is the Linux system, the USB device may alternatively select the HID protocol as a communication protocol between the USB device and the host, set the values of the first preset field and the third preset field in the interface descriptor as a seventeenth preset value and an eighteenth preset value respectively, and perform data communication with the host through the selected communication protocol. In this case, the configuration descriptor is configured to describe the configuration information of the USB device, the interface descriptor is configured to describe the interface information of the USB device; the first preset field is a bInterfaceClass field; the third preset field is a bInterfaceSubClass; the seventeenth preset value is 0x03 or an else value; the eighteenth preset value is 0 or 1, or an else value. In addition, the USB device may further send an endpoint descriptor, an HID descriptor, a reporting descriptor and an entity descriptor to the host. In this case, the endpoint descriptor is configured to describe information of the port used by the interface of the USB device; the HID descriptor is configured to describe features possessed by a USB device which functions as an HID device; the entity descriptor is configured to describe the behavior features possessed by a USB device which functions as an HID device.

In the case that the USB device is determined being Linux system, the USB device may shield its self-contained content which is not adaptable to the Linux system. For example, in the case that the USB device determines that the host operating system is Linux system and states itself as a SCSI compact device, the USB device may shield a its self-contained ISO file.

In the technical solution of Embodiment 2, the USB device analyzes two commands of obtaining configuration descriptor which are sent consecutively by the host, determines the host operating system based on the values of the length bytes in the commands, performs data communication with the host with corresponding communication protocol according to the operating system after the host operating system is determined, and shields the files which can not be operated by the host operating system to make the host recognize and operate the USB device correctly and make the USB device and its application optimized.

Embodiment 3

Figure 3:
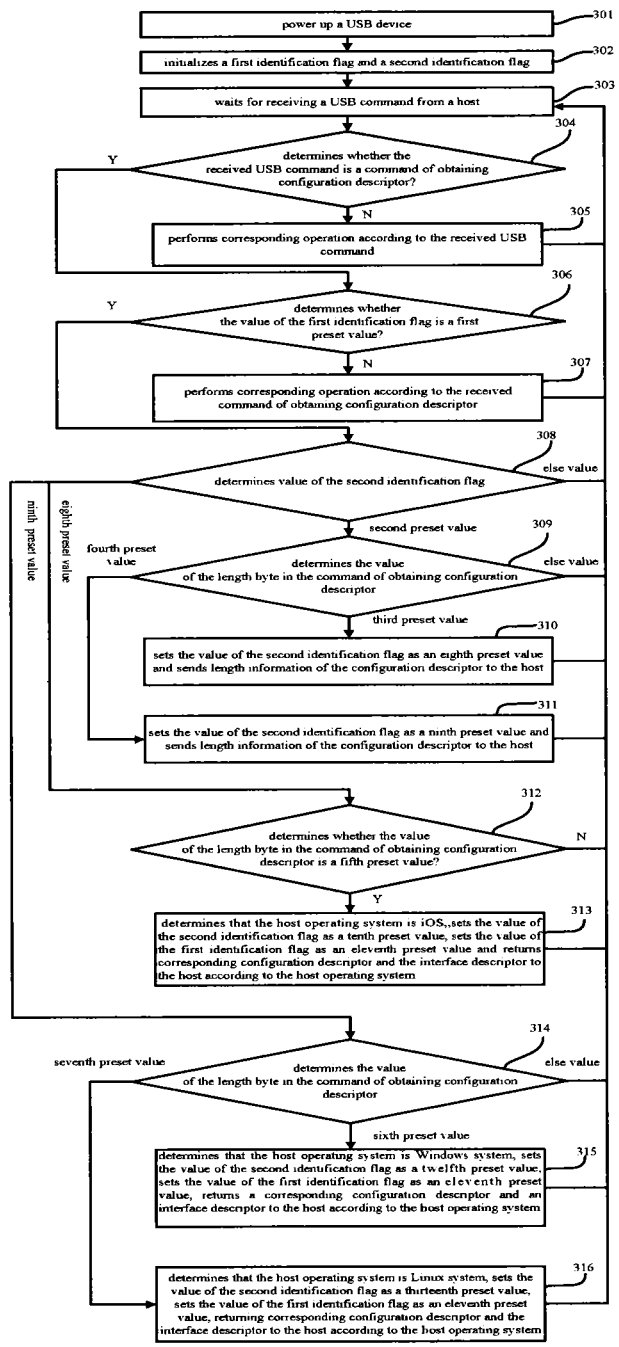
FIG. 3 is a flow chart for a method for a USB device recognizing host operating system provided in embodiment 3 of the present invention.

FIG. 3 shows a flowchart of method of a USB device recognizing host operating system in Embodiment 3 of the present invention. The method includes following step 301 to step 316.

In step 301, the USB device is powered up.

In practice, the USB device may connect to the host via a universal serial bus and obtains working voltage from a power source voltage or a working voltage (Vcc) of a host. In this case, the USB device may be a peripheral of a computer such as a security device, a USB device, a card reader, a storage device like a USB flash disk, a key board, a mouse, etc.

In step 302, the USB device initializes a first identification flag and a second identification flag.

The USB device may set a value of the first identification flag as a first preset value, set a value of the second identification flag as a second preset value. In this case, the first identification flag is configured to determine whether the host operating system is recognized by the USB device; the second identification flag is configured to recognize the type of the host operating system. In the case that the value of the first identification flag is the first preset value, it indicates that the host operating system is not recognized by the USB device; in the case that the value of the second identification flag is the second preset value, it indicates that the type of the operating system is unknown. For example, the first preset value and the second preset value may be 0.

In step 303, the USB device waits for receiving a USB command from the host.

In step 304, the USB device determines whether the received USB command is a command of obtaining a configuration descriptor, goes to step 306 in the case of a positive determination; otherwise, goes to step 305.

In this case, the command of obtaining a configuration descriptor is a USB command which is sent to the USB device at a stage that the host enumerates the USB device. The host sends the command of obtaining a configuration descriptor to the USB device to obtain a configure descriptor of the USB device.

In step 305, the USB device performs a corresponding operation according to the received USB command; goes back to step 303.

In step 306, the USB device determines whether the value of the first identification flag is the first preset value, goes to step 308 in the case of a positive determination; otherwise, goes to step 307.

In step 307, the USB device performs a corresponding operation according to the received command of the obtaining configuration descriptor, goes back to step 303.

In step 308, the USB device determines the value of the second identification flag is the second preset value, goes to step 309 if the value of the second identification flag is the second preset value; if the value of the second identification flag is an eighth preset value, goes to step 312; if the value of the second identification flag is a ninth preset value, goes to step 314; if the value of the second identification flag is an else value, the USB device sends preset descriptor information to the host, and goes back to step 303.

In step 309, the USB device determines the value of a length byte in the received command of obtaining a configuration descriptor; if the value of the length byte is a third preset value, goes to step 310; if the value of the length byte is a fourth preset value, goes to step 311; if the value of the length byte is an else value, the USB sends the preset descriptor information to the host, and goes to step 303.

In this case, the command of obtaining a configuration descriptor may contain data DATA0 with a length of 8 bytes; the length byte is the seventh byte of DATA0 of the command of obtaining a configuration descriptor and is configured to inform the USB device the length of the data needed to be returned to the host. In Embodiment 3, the third preset value is 0x04, the fourth preset value is 0x09, the fifth preset value is 0x56, the sixth preset value is 0xFF and the seventh preset value is 0x20.

For example, the command of obtaining a configuration descriptor received by the USB device from the host is:

```
PID:SETUP  ADDR:00  ENDP:00  CRC5:02  idle:3
PID:DATA0  data:80 06 00 01 00 00 08 00  CRC16:94eb  idle:7
PID:ACK  idle:3a.
```

The value of the seventh byte, read by the USB device, in the data field of the command of obtaining a configuration descriptor above is 0x08; the USB device determines that the value of the length byte in the command of obtaining a configuration descriptor is 0x08 and the USB device itself is required to return data with 8 byte to the host.

In step 310, the USB device sets the value of the second identification flag as the eighth preset value and sends length information of the configuration descriptor to the host; goes back to step 303.

In this case, in the case that the value of the second identification flag is the eighth preset value, it indicates that the host operating system may be iOS. In Embodiment 3, the eighth preset value is iOSRe.

In step 311, the USB device sets the value of the second identification flag as the ninth preset value and sends length information of the configuration descriptor to the host; goes back to step 303.

In this case, in the case that the value of the second identification flag is the ninth preset value, it indicates that the host operating system may be the Linux system or the Windows system. In Embodiment 3, the ninth preset value is Linux system/Windows_Re.

In step 312, the USB device determines whether the value of the length byte in the command of obtaining a configuration descriptor is the fifth preset value, goes to step 313 in the case of a positive determination; otherwise, the USB device sends preset descriptor information to the host; goes back to the step 303.

In step 313, the USB device determines that the host operating system is iOS, sets the value of the second identification flag as a tenth preset value, sets the value of the first identification flag as an eleventh preset value and returns a corresponding configuration descriptor and a corresponding interface descriptor to the host according to the host operating system; goes back to step 303.

In the case that the value of the second identification flag is the tenth preset value, it indicates that the host operating system is the iOS; in the case that the value of the first identification flag is the eleventh preset value, it indicates the host operating system is recognized by the USB device. In Embodiment 3, the tenth preset value is iOS; the eleventh preset value is 1.

In the case that the USB device recognizes that the host operating system is the iOS, the USB device selects the CCID protocol as a communication protocol between the USB device and the host, sets the value of a first preset field in the interface descriptor as a fourteenth preset value, sends the configuration descriptor and the interface descriptor to the host and performs data communication with the host through the selected communication protocol. In this case, the configuration descriptor is configured to describe configuration information of the USB device; the interface descriptor is configured to describe the interface information of the USB device; the first preset field is a bInterfaceClass field; the fourteenth preset value is 0x0B or an else value. In addition, the USB device further may send an endpoint descriptor and a CCID descriptor to the host, where the endpoint descriptor is configured to describe information of a port used by the interface of the USB device; the CCID descriptor is configured to describe features possessed a USB device which functions as a CCID device.

In the case that the USB device determines that the host operating system is the iOS, the USB device may further shield its self-contained content which is not adaptable to the iOS.

In step 314, the USB device determines the value of the length byte in the received command of obtaining a configuration descriptor, goes to step 315 if the value of the length byte is the sixth preset value; if the value of the length byte is the seventh preset value, goes to step 316; if the value of the length byte is an else value, the USB device sent the preset descriptor information to the host; goes back to step 303.

In step 315, in the case that the USB device determines that the host operating system is the Windows system, the USB device sets the value of the second identification flag as a twelfth preset value, sets the value of the first identification flag as an eleventh preset value, sends a corresponding configuration descriptor and a corresponding interface descriptor to the host according to the host operating system; goes back to step 303.

In the case that the value of the second identification flag is the twelfth preset value, it indicates that the host operating system is the Windows system; in the case that the value of the first identification flag is the eleventh preset value, it indicates that the host operating system is recognized by the USB device. In Embodiment 3, the twelfth preset value is Windows; the eleventh preset value is 1.

In Embodiment 3, in the case that the USB device determines that the host operating system is the Windows system, the USB device may select the SCSI protocol as a communication protocol between the USB device and the host, set the values of the first preset field and the second preset field in the interface descriptor as a fifteenth preset value and a sixteenth preset value respectively and perform data communication with the host through the selected communication protocol. The configuration descriptor is configured to describe the configuration information of the USB device; the interface descriptor is configured to describe the interface information of the USB device; the first preset field is a bInterfaceClass field; the second preset field is a bInterfaceProtocol field; the fifteenth preset value is 0x08 or an else value; the sixteenth preset value is 0x50 or an else value. In addition, the USB device may also send an endpoint descriptor to the host; the endpoint descriptor is configured to describe information of a port used by the interface of the USB device.

In the case that the USB device recognizes that the host operating system is the Windows system, the USB device may alternatively select the HID protocol as a communication protocol between the USB device and the host, set the values of the first preset field and the third preset field in the interface descriptor as a seventeenth preset value and an eighteenth preset value respectively, and perform data communication with the host through the selected communication protocol. In this case, the configuration descriptor is configured to describe the configuration information of the USB device; the interface descriptor is configured to describe the interface information of the USB device; the first preset field is a bInterfaceClass field; the third preset field is a bInterfaceSubClass; the seventeenth preset value is 0x03 or an else value; the eighteenth preset value is 0 or 1, or an else value. In addition, the USB device may further send an endpoint descriptor, an HID descriptor, a reporting descriptor and an entity descriptor to the host. In this case, the endpoint descriptor is configured to describe information of a port used by the interface of the USB device; the HID descriptor is configured to describe the features possessed by a USB device which functions as an HID device; the entity descriptor is configured to describe behavior features possessed by a USB device which functions as an HID device.

In the case that the USB device determines that the host operating system is the Windows system, the USB device may shield its self-contained content which is not adaptable to the Windows system.

In step 316, the USB device determines the host operating system being Linux system, sets the value of the second identification flag as a thirteenth preset value, sets the value of the first identification flag as an eleventh preset value, sends a corresponding configuration descriptor and a corresponding interface descriptor to the host according to the host operating system; goes back to step 303.

In the case that the value of the second identification flag is the thirteenth preset value, it indicates that the host operating system is the Linux system; in the case that the value of the first identification flag is the eleventh preset value, it indicates that the host operating system is recognized by the USB device. In Embodiment 3, the thirteenth preset value is the Linux system; the eleventh preset value is 1.

In Embodiment 3, in the case that the USB device recognizes that host operating system is the Linux system, the USB device may select the SCSI protocol as a communication protocol between the USB device and the host, set the values of the first preset field and the second preset field in the interface descriptor as the fifteenth preset value and the sixteenth preset value respectively, perform data communication with the host through the selected communication protocol. In this case, the configuration descriptor is configured to describe the configuration information of the USB device; the interface descriptor is configured to describe interface information of the USB device; the first preset field is a bInterfaceClass field; the second preset field is a bInterfaceProtocol field, the fifteenth preset value is 0x08 or an else value; the sixteenth preset value is 0x50 or an else value. In addition, the USB device may further send an endpoint descriptor to the host; the endpoint descriptor is configured to describe information of a port used by the interface of the USB device.

In the case that the USB device recognizes that the host operating system is the Linux system, the USB device may alternatively select the HID protocol as a communication protocol between the USB device and the host, set the values of the first preset field and the third preset field in the interface descriptor as a seventeenth preset value and an eighteenth preset value respectively, and perform data communication with the host through the selected communication protocol. In this case, the configuration descriptor is configured to describe configuration information of the USB device, the interface descriptor is configured to describe interface information of the USB device; the first preset field is a bInterfaceClass field; the third preset field is a bInterfaceSubClass; the seventeenth preset value is 0x03 or an else value; the eighteenth preset value is 0 or 1, or an else value. In addition, the USB device may further send an endpoint descriptor, an HID descriptor, a reporting descriptor and an entity descriptor to the host. In this case, the endpoint descriptor is configured to describe information of a port used by the interface of the USB device; the HID descriptor is configured to describe features possessed by a USB device which functions as a HID device; the entity descriptor is configured to describe behavior features possessed by a USB device which functions as a HID device.

In the case that the USB device is determined being the Linux system, the USB device may shield its self-contained content which is not adaptable to the Linux system. For example, in the case that the USB device recognizes that the host operating system is the Linux system and states itself as a SCSI compact device, the USB device may shield a its self-contained ISO file.

In technical solution of Embodiment 3, after the USB device receives the command of obtaining a configuration descriptor sent by the host, the USB device determines the value of its first identification flag and the value of the second identification flag, analyzes the command of obtaining a configuration descriptor, determines the host operating system according to the value of its first identification flag, the value of its second identification flag and the value of the length byte of the command of obtaining a configuration descriptor, performs data communication with the host according to the communication protocol used by the operating system after the USB device recognizes the host operating system, and shields files which can not be operated by the host operating system to make the host recognize and operate the USB device correctly and make the USB device and its application optimized.

Embodiment 4

Figure 4:
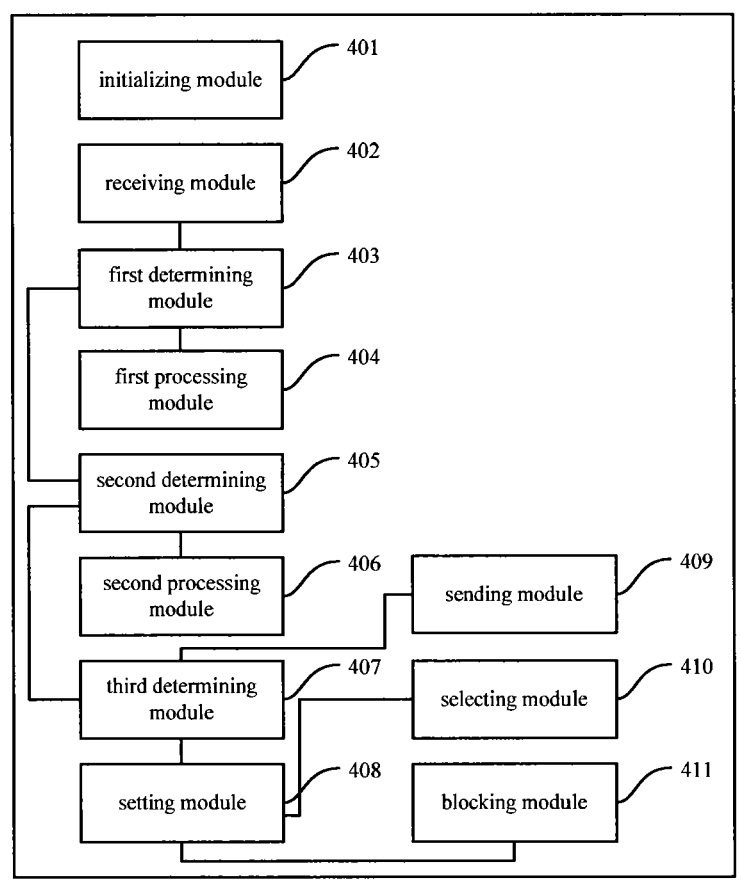
FIG. 4 is structural diagram of a USB device of embodiment 4 of the present invention.

FIG. 4 is a structural diagram of a USB device provided in Embodiment 4 of the present invention. The USB device includes an initializing module 401, a receiving module 402, a first determining module 403, a first processing module 404, a second determining module 405, a second processing module 406, a third determining module 407, a setting module 408 and a sending module 409.

The initializing module 401 is configured to initialize a first identification flag and a second identification flag to a first preset value and a second preset value respectively.

The receiving module 402 is configured to receive a USB command from a host.

The first determining module 403 is configured to determine whether the USB command received by the receiving module 402 is a command of obtaining a configuration descriptor.

The first processing module 404 is configured to perform an operation corresponding to the USB command in the case that the first determining module 403 determines that the USB command is not the command of obtaining a configuration descriptor.

In the case that the first determining module 403 determines that the USB command is not a command of obtaining configuration, the first processing module 404 performing the operation corresponding to the USB command includes performing the operation corresponding to the received USB command according to the host operating system.

The second determining module 405 is configured to determine whether the value of the first identification flag is a first preset value in the case that the first determining module 403 determines that the USB command is the command of obtaining a configuration descriptor.

The second processing module 406 is configured to perform a corresponding operation according to the command of obtaining a configuration descriptor in the case that the second determining module 405 determines that the value of the first identification flag is not the first preset value.

The second processing module 406 performing the corresponding operation in the case that the second determining module 405 determines that the value of the first identification flag is not the first preset value includes performing the operation corresponding to the received command of obtaining a configuration descriptor according to the host operating system.

The third determining module 407 is configured to determine a value of the length byte and the value of the second identification flag in the command of obtaining a configuration descriptor in the case that the second determining module 405 determines that the value of the first identification flag is the first preset value.

The setting module 408 is configured to:

set the value of the second identification flag as an eighth preset value in the case that the third determining module 407 determines that the value of the second identification flag is the second preset value and the value of the length byte is a third preset value; set the value of the second identification flag as a ninth preset value in the case that the third determining module 407 determines that the value of the second identification flag is the second preset value and the value of the length byte is a fourth preset value; set the value of the first identification flag as an eleventh preset value in the case that the third determining module 407 determines that the value of the second identification flag is an eighth preset value and the value of the length byte is a fifth preset value, and the host operating system is the iOS;

set the value of the first identification flag as the eleventh preset value in the case that the third determining module 407 determines that the value of the second identification flag is the ninth preset value, the value of the length byte is the a sixth preset value and the host operating system is the Windows system;

set the value of the first identification flag as the eleventh preset value in the case that the third determining module 407 determines that the value of the second identification flag is the ninth preset value, the value of the length byte is a seventh preset value, the host operating system is the Linux system.

The above setting module 408 is further configured to:

set the value of the second identification flag as a tenth preset value in the case that the third determining module 407 determines that the value of the second identification flag is the eighth preset value, and the value of the length byte is the fifth preset value;

set the value of the second identification flag as an twelfth preset value in the case that the third determining module 407 determines that the value of the second identification flag is the ninth preset value and the value of the length byte is a sixth preset value;

set the value of the second identification flag as a thirteenth preset value in the case that the third determining module 407 determines that the value of the second identification flag is the ninth preset value and the value of the length byte is a seventh preset value.

The sending module 409 is configured to:

in the case that the third determining module 407 determines that the value of the second identification flag is the second preset value, the value of the length byte is a third preset value or a fourth preset value, send length information of the configuration descriptor to the host;

in the case that the third determining module 407 determines that the value of the second identification flag is the eighth preset value and the value of the length byte is the fifth preset value, or determines that the value of the second identification flag as the ninth preset value and the value of the length byte is the sixth preset value or the seventh preset value, send a configuration descriptor to the host;

in the case that the third determining module 407 determines that the value of the second identification flag and the value of the length byte is an else value, send preset descriptor information to the host.

The USB device above further includes a selecting module 410.

The selecting module 410 configured to:

in the case that the third determining module 407 determines that the value of the second identification flag is the eighth preset value and the value of the length byte is the fifth preset value, select the CCID protocol as a communication protocol between the USB device and the host;

in the case that the third determining module 407 determines that the value of the second identification flag is the ninth preset value and the value of the length byte is the sixth preset value, or determines that the value of the second identification flag is ninth preset value and the value of the length byte is the seventh preset value, select the SCSI protocol or the HID protocol as a communication protocol between the USB device and the host.

In the case that the third determining module 407 determines that the value of the second identification flag is the eighth preset value and the value of the length byte is the fifth preset value, the selecting module 410 selecting the CCID protocol as a communication protocol between the selecting module and the host includes:

setting a value of a first preset field in a interface descriptor as the a fourteenth preset value, sending a configuration descriptor and the interface descriptor to the host; or setting the value in the first preset field in the interface descriptor as the fourteenth preset value, sending the interface descriptor, an endpoint descriptor and a CCID descriptor to the host.

In the case that the determining module 407 determines that the value of the second identification flag is the ninth preset value and the value of the length byte is the sixth preset value or the seventh preset value, the selecting module 410 selecting the SCSI protocol or the HID protocol as a communication protocol between the selecting module 410 and the host includes:

setting values of the first preset field and the second preset field in the interface descriptor as a fifteenth preset value and a sixteenth preset value respectively, sending the interface descriptor to the host; or setting the value of the first preset field and the value of the second preset field in the interface descriptor as the fifteenth preset value and the sixteenth preset value, sending the interface descriptor and the endpoint descriptor to the host; or setting the value of the first preset field and the value of the second preset field in the interface descriptor as a seventeenth preset value and an eighteenth preset value, sending the interface descriptor to the host; or setting the value of the first preset field and the value of the second preset field in the interface descriptor as the seventeenth preset value and the eighteenth preset value, send the interface descriptor, the endpoint descriptor, an HID descriptor, a reporting descriptor and an entity descriptor to the host.

The USB device further includes a shielding module 411. The shielding module 411 is configured to:

in the case that the third determining module 407 determines that the value of the second identification flag is the eighth preset value and the value of the byte length is the fifth preset value, shield content, contained in the USB device, which is not adaptable to the iOS;

in the case that the third determining module 407 determines that the value of the second identification flag is the ninth preset value, and the value of the length byte is the sixth preset value, shield the content, contained in the USB device, which is not adaptable to the Windows system;

in the case that the third determining module 407 determines that the value of the second identification flag is the ninth preset value, and the value of the length byte is the seventh preset value, shield the content, contained in the USB device, which is not adaptable to the Linux system.

In technical solution of Embodiment 4, the USB device, according to the value of its first identification flag and the value of its second identification flag and the value of the length byte of the command of obtaining a configuration descriptor, determines the host operating system, performs data communication with the host through a corresponding communication protocol according to the operating system, shields a file which can not be operated under the operating system to make the host correctly recognize and operate the USB device and make the USB device and its application optimized.

Steps of Embodiments disclosed by the present invention can be implemented by hardware, software module executed by a processor or combination of hardware and the software module. The software module can be arranged in Random Access Memory (RAM), memory, Read-Only Memory (ROM), Electric Programmable ROM, Electric Erasable Programmable ROM, register, hardware disk, mobile disk, CD-ROM, or storage media in any other forms known in the conventional technology.

The above description is only the preferable implementation of the invention, and the protection scope thereof is not restricted herein. The variation or replacement within the technical scope made by those skilled in the art may fall into the protection scope of the invention. Therefore, the protection scope of the invention may be subject to the protection scope of the claims.

The invention claimed is:

1. A method for a Universal Serial Bus (USB) device recognizing host operating system, comprising:
   step S1 comprising powering up the USB device;
   step S2 comprising initializing, by the USB device, a first identification flag and a second identification flag of the USB device to a first preset value and a second preset value respectively;
   step S3 comprising waiting, by the USB device, for a USB command from a host;
   step S4 comprising determining, by the USB device, whether a received USB command is a command of obtaining a configuration descriptor, going to step S6 in the case of a positive determination; otherwise, going to step S5;
   step S5 comprising performing, by the USB device, a corresponding operation according to the received USB command; going back to step S3;
   step S6 comprising determining, by the USB device, whether a value of the first identification flag is the first preset value, going to step S8 in the case of a positive determination; otherwise, going to step S7;
   step S7 comprising performing, by the USB device, a corresponding operating according to the received command of obtaining a configuration descriptor; going back to step S3;
   step S8 comprising determining, by the USB device, a value of a length byte in the received command of obtaining a configuration descriptor and a value of the second identification flag;
   when the value of the second identification flag is the second preset value and the value of the length byte is a third preset value, going to step S9;
   when the value of the second identification flag is the second preset value and the value of the length byte is a fourth preset value, going to step S10;
   when the value of the second identification flag is an eighth preset value and the value of the byte length is a fifth preset value, going to step S11;
   when the value of the second identification flag is a ninth preset value and the value of the byte length is a sixth preset value, going to step S12;
   when the value of the second identification flag is the ninth preset value and the value of the length byte is a seventh preset value, going to step S13;
   otherwise, sending, by the USB device, preset descriptor information to the host; going back to step S3;

step S9 comprising setting, by the USB device, the value of the second identification flag as the eighth preset value and sending the length information of the configuration descriptor to the host; going back to step S3;

step S10 comprising setting, by the USB device, the value of the second identification flag as the ninth preset value and sending the length information of the configuration descriptor to the host; going back to step S3;

step S11 comprising determining, by the USB device, that an operating system of the host is a first operating system, setting the value of the first identification flag as an eleventh preset value, sending a configuration descriptor to the host; going back to step S3;

step S12 comprising determining, by the USB device, that the operating system of the host is a second operating system, setting the value of the first identification flag as the eleventh preset value, sending a configuration descriptor to the host; going back to step S3; and step S13 comprising determining, by the USB device, that the operating system of the host is a third operating system, setting the value of the first identification flag as the eleventh preset value, sending a configuration descriptor to the host; going back to step S3, wherein the first operating system, the second operating system and the third operating system are different operating systems.

2. The method of claim 1. wherein, after the operating system of the host is determined as the first operating system by the USB device, the method further comprises:

setting the value of the second identification flag as a tenth preset value;

or after the operating system of the host is determined as the second operating system by the USB device, the method further comprises:

setting the value of the second identification flag as a twelfth preset value;

or after the operating system of the host is determined as the third operating system by the USB device, the method further comprises:

setting the value of the second identification flag as a thirteenth preset value.

3. The method of claim 1, wherein performing, by the USB device, a corresponding operation according to the received USB command comprises:

performing, by the USB device, an operation corresponding to the received USB command according to the operating system of the host.

4. The method of claim 1, wherein, performing, by the USB device, a corresponding operation according to the received command of obtaining a configuration descriptor comprises:

performing, by the USB device, an operation corresponding to the received command of obtaining a configuration descriptor according to the operation system of the host.

5. The method of claim 1, wherein, after the operating system of the host is determined as the first operating system by the USB device, the method further comprises:

selecting, by the USB device, a Chip/Smart Card Interface Devices (CCID) protocol as a communication protocol between the USB device and the host;

or after the operating system of the host is determined as the second operating system or the third operating system by the USB device, the method further comprises:

selecting, by the USB device, a Small Computer System Interface protocol or an Human Interface Device (HID) protocol as a communication protocol between the USB device and the host.

6. The method of claim 5, wherein selecting, by the USB device, a CCID protocol as a communication protocol between the USB device and the host comprises:

setting, by the USB device, a value of a first preset field in a interface descriptor as a fourteenth preset value and sending the interface descriptor to the host; or setting, by the USB device. the value of the first preset field in the interface descriptor as the fourteenth preset value and sending the interface descriptor, an endpoint descriptor and a CCID descriptor to the host;

or setting, by the USB device, a SCSI protocol as a communication protocol between the USB device and the host comprises:

setting, by the USB device, values of the first preset field and a second preset field in the interface descriptor as a fifteenth preset value and a sixteenth preset value respectively, sending the interface descriptor to the host; or, setting, by the USB device, the values of the first preset field and the second preset field in the interface descriptor as the fifteenth preset value and the sixteenth preset value respectively, sending the interface descriptor and the endpoint descriptor to the host;

or selecting, by the USB device, an HID protocol as a communication protocol between the USB device and the host comprises:

setting, by the USB device, the values of the first preset field and the second preset field in the interface descriptor as a seventeenth preset value and an eighteenth preset value respectively, sending the interface descriptor to the host; or, setting, by the USB device, the values of the first preset field and the second preset field in the interface descriptor as the seventeenth preset value and the eighteenth preset value respectively, sending the interface descriptor, the endpoint descriptor, an HID descriptor, a reporting descriptor and an entity descriptor to the host.

7. The method of claim 1, wherein, after the operating system of the host is determined as the first operating system by the USB device, the method further comprises:

shielding, by the USB device, content, contained by the USB device, which is not adaptable to the first operating system;

or after the operating system of the host is determined as the second operating system by the USB device, the method further comprises:

shielding, by the USB device, content, contained by the USB device, which is not adaptable to the second operating system;

or after the operating system of the host is determined as the third operating system by the USB device, the method further comprises:

shielding, by the USB device, content, contained by the USB device, which is not adaptable to the third operating system.

8. A Universal Serial Bus device, comprising: at least one processor and a memory having processor-executable instructions stored therein, and the instructions when executed by the at least one processor, configure the device to execute following instruction modules:

an initializing module configured to initialize a first identification flag and a second identification flag to a first preset value and a second preset value respectively;

a receiving module configured to receive a USB command from a host;

a first determining module configured to determine whether a USB command received by the receiving module is a command of obtaining a configuration descriptor;

a first processing module configured to, when the first determining module determines that the USB command is not the command of obtaining a configuration descriptor, perform a corresponding operation according to the USB command;

a second determining module configured to, when the first determining module determines that the USB command is the command of obtaining a configuration descriptor, determine whether a value of the first identification flag is the first preset value;

a second processing module configured to, when the second determining module determines that the value of the first identification flag is not the first preset value, perform a corresponding operation according to the command of obtaining a configuration descriptor;

a third determining module configured to, when the second determining module determines that the value of the first identification flag is the first preset value, determine a value of a length byte and a value of the second identification flag in the command of obtaining a configuration descriptor;

a setting module configured to, when the third determining module determines that the value of the second identification flag is the second preset value and the value of the length byte is a third preset value, set the second identification flag as an eighth preset value; when the third determining module determines that the value of the second identification flag is the second preset value and the value of the length byte is a fourth preset value, set the value of the second identification flag as a ninth preset value; when the third determining module determines that the value of the second identification flag is the eighth preset value and the value of the length byte is a fifth preset value, determine that the operating system of the host is a first operating system and set the value of the first identification flag as an eleventh preset value; when the third determining module determines that the value of the second identification flag is the ninth preset value and the value of the length byte is a sixth preset value, determine that the operating system of the host is a second operating system and set the value of the first identification flag as the eleventh preset value; when the third determining module determines that the value of the second identification flag is the ninth preset value and the value of the length byte is a seventh preset value, determine the operating system of the host is a third operating system and set the value of the first identification flag as the eleventh preset value, wherein the first operating system, the second operating system and the third operating system are different operating systems; and a sending module configured to, when the third determining module determines that the value of the second identification flag is the second preset value and the value of the length byte is the third preset value or the fourth preset value, send length information of the configuration descriptor to the host; when the third determining module determines that the value of the second identification flag is the eighth preset value and the value of the length byte is the fifth preset value, or the third determining module determines that the value of the second identification flag is the ninth preset value and the value of the length byte is a sixth preset value or a seventh preset value, send the configuration descriptor to the host; when the third determining module determines that the value of the second identification flag and the value of the length byte are else values, send preset descriptor information to the host.

9. The USB device of claim 8, wherein the setting module is further configured to, when the third determining module determines that the value of the second identification flag is the eighth preset value and the value of the length byte is the fifth preset value, set the value of the second identification flag as a tenth preset value;

when the third determining module determines that the value of the second identification flag is the ninth preset value and the value of the length byte is the sixth preset value, set the value of the second identification flag as a twelfth preset value;

when the third determining module determines that the value of the second identification flag is the ninth preset value and the value of the length byte is the seventh preset value, set the value of the second identification flag as a thirteenth preset value.

10. The USB device of claim 8, wherein, when the first determining module determines that the USB command is not a command of obtaining a configuration descriptor, the first processing module configured to perform a corresponding operation according to the USB command comprises:

the first processing module configured to perform an operation corresponding to the received USB command according to the operating system of the host.

11. The USB device of claim 8, wherein when the second determining module determines that the value of the first identification flag is not the first preset value, the second processing module is configured to perform a corresponding operation according to the command of obtaining a configuration descriptor comprises:

the second processing module is configured to perform an operation corresponding to the received command of obtaining a configuration descriptor according to the operating system of the host.

12. The USB device of claim 8, wherein, the instruction modules further comprises:

a selecting module configured to, when the third determining module determines that the value of the second identification flag is the eighth preset value and the value of the length byte is the fifth preset value, select a Chip/Smart Card Interface Devices (CCID) protocol as a communication protocol between the USB device and the host; when the third determining module determines that the value of the second identification flag is the ninth preset value, and the value of the length byte is the sixth preset value, or, determines that the value of the second identification flag is the ninth preset value and the value of the length byte is the seventh preset value, select a Small Computer System Interface (SCSI) protocol or an Human Interface Device (HID) protocol as a communication protocol between the USB device and the host.

13. The USB device of claim 12, wherein when the third determining module determines that the value of the second identification flag is the eighth preset value and the value of the length byte is the fifth preset value, the selecting module is configured to select a CCID protocol as a communication protocol between the USB device and the host comprises:
the selecting module configured to set a value of a first preset field in a interface descriptor as a fourteenth preset value, send the interface descriptor to the host; or set the value of the first preset field in the interface descriptor as the fourteenth preset value, send the interface descriptor, an endpoint descriptor and a CCID descriptor to the host;
when the third determining module determines that the value of the second identification flag is the ninth preset value and the value of the length byte is the sixth preset value or the seventh preset value, the selecting module is configured to select a SCSI protocol or an HID protocol as a communication protocol between the USB device and the host comprises:
the selecting module configured to set values of the first preset field and a second preset field in the interface descriptor as a fifteenth preset value and a sixteenth preset value respectively and send the interface descriptor to the host; or set the values of the first preset field and the second preset field in the interface descriptor as the fifteenth value and the sixteenth value respectively and send the interface descriptor and the endpoint descriptor to the host; or set the values of the first preset field and the second preset field in the interface descriptor to a seventeenth preset value and an eighteenth preset value respectively and send the interface descriptor to the host; or set the values of the first preset field and the second preset field in the interface descriptor as the seventeenth preset value and the eighteenth preset value respectively and send the interface descriptor, the endpoint descriptor, an HID descriptor, a reporting descriptor and an entity descriptor to the host.

14. The USB device of claim 8, wherein, the instruction modules further comprises:
a shielding module configured to, when the third determining module determines that the value of the second identification flag is the eighth preset value and the value of the length byte is the fifth preset value, shield content, contained in the USB device, which is not adaptable to the first operating system; when the third determining module determines that the value of the second identification flag is the ninth preset value and the value of the length byte is the sixth preset value, shield content, contained in the USB device, which is not adaptable to the second operating system; and when the third determining module determines that the value of the second identification flag is the ninth preset value and the value of the length byte is the seventh preset value, shield, content, contained in the USB device, which is not adaptable to third operating system.

* * * * *